United States Patent Office 3,600,448
Patented Aug. 17, 1971

3,600,448
HALOALLYLIC COMPOUNDS AND THEIR
PREPARATION
Gene C. Robinson, 1064 N. Leighton Drive,
Baton Rouge, La. 70806
No Drawing. Continuation of application Ser. No.
536,604, Mar. 23, 1966. This application Aug. 6,
1969, Ser. No. 849,593
Int. Cl. C07c 39/26
U.S. Cl. 260—623D    17 Claims

ABSTRACT OF THE DISCLOSURE

β-Haloallylic phenols are prepared by heating a gem-dihalocyclopropane, a phenolic compound having at least one ortho or para hydrogen substituent on the phenolic nucleus, and an alkali metal salt of a phenolic compound to a suitable reaction temperature (e.g., 100 to 200° C.). Novel β-haloallylic phenols are described. These are suitable for use as germicides, fungicides, pesticides, antioxidants, and intermediates for the synthesis of benzofurans.

This application is a continuation of my prior copending application Ser. No. 536,604, filed Mar. 23, 1966, now abandoned.

This invention relates to the discovery that by reacting a gem-dihalocyclopropane, a phenolic compound having at least one ortho or para hydrogen substituent on the phenolic nucleus, and an alkali metal salt of a phenolic compound at a suitable temperature, β-haloallylic phenols can be prepared and isolated in good yields. Smaller quantities of benzofurans or of benzofurans and β-haloallyl ethers are usually copresent in the reaction products. In the absence of the alkali metal aryloxide, the only identifiable products of the reaction are benzofurans (cf. U.S. 3,230,237).

As explained in the foregoing patent, gem-dihalocyclopropanes comprise two general types of compounds, those containing only the cyclopropane ring in the ring system and those having an additional ring fused to the cyclopropane ring (i.e., n,n-dihalobicyclo[n-3.1.0]-hydrocarbon compounds). Both types are suitable for the practice of this invention and reference should be had to the above patent for various examples of suitable reactants for the present process. From the standpoints of cost and ease of preparation, the use of gem-dichlorocyclopropanes of either type is preferred.

The prime requirement as regards the phenolic compound used in the process is that it have at least one hydrogen substituent on the phenolic nucleus—i.e., the aromatic nucleus to which a hydroxyl group is bonded—and this substituent should be ortho or para to a hydroxyl group. Hence, use may be made of a variety of phenolic compounds—these may be mono- or polyhydroxy compounds, and they may contain one or a plurality of rings in the molecule. Moreover, they may be substituted in the ring(s) with inert groups such as alkyl, cycloalkyl, aralkyl, nitro, alkoxy and like groups, provided at least one of the ortho or para carbon atoms of the phenolic ring carries a hydrogen atom. In selecting phenolic compounds for the present reaction, attention should be given to steric considerations; highly substituted phenolic compounds—i.e., those in which the substituent groups are "bulky" so that each of the reactive ortho and/or para hydrogen atom(s) is shielded—may resist β-halo allylation via this process. Thus use may be made of such compounds as phenol, resorcinol, catechol, hydroquinone, 1-naphthol, 2-naphthol, 4 - hydroxydiphenyl, 4,4'-dihydroxydiphenyl, 4,4'-methylenebisphenol, o-, m-, and p-cresol, p-benzylphenol, o-cyclohexyl phenol, o-ethyl phenol, o-isopropyl phenol, o-, m-, and p-tert-butyl phenol, 2,6-diisopropyl phenol, 2, 6-di-tert-butyl phenol, o-tert-amyl phenol, p-nonyl phenol, 4-methyl-1-naphthol, o-, m-, and p-nitrophenol, 4-hydroxyanisole, 2,3,4-trimethyl phenol and the like.

The preferred phenolic compounds are the mononuclear, monohydric phenols having an available reaction site in the ring, viz, those which have a hydrogen substituent on at least one of the ortho positions or the para position. Phenol itself is particularly preferred.

The third reagent used in the process—viz, the alkali metal salt of a phenolic compound—may be formed from a phenolic compound which is different from the phenolic compound initially present as such in the reaction system. For example, the system may comprise 2,6-di-tert-butyl phenol and sodium phenoxide, and this may be of advantage in reactions involving a highly hindered, 2,6-dialkylated phenol which does not form the usual phenoxide salt (cf. U.S. 2,903,487). However, it is generally preferable to utilize an alkali metal salt of a phenolic compound corresponding to the free phenolic compound likewise present in the initial system. Thus, use may be made of the aryloxy compounds of lithium, sodium, potassium, rubidium, cesium, or mixtures thereof, and these may be preformed or formed in situ from the alkali metal. The use of sodium salts of phenolic compounds, especially sodium phenoxide, is particularly preferred from the cost-effectiveness standpoint.

The relative proportions of the foregoing reagents are not critical and thus susceptible to variation. However, it is usually desirable to employ an excess of the alkali metal aryloxide and a larger excess of the phenolic compound relative to the amount of gem-dihalocyclopropane present in the reaction system. For example, the use of from about 1.1 to about 2.0 moles of alkali metal aryloxide and from about 2 to about 20 moles of phenolic compound per mole of alkali metal aryloxide affords very good yields of β-haloallylated phenolic compound.

Elevated temperatures are generally used to effect β-haloallylation pursuant to this invention. Temperatures of within the range of 100 to about 200° C. are generally sufficient to effect the reaction although in some instances the reaction may be initiated or conducted at temperatures somewhat below or somewhat above this range. In general, the gem-dibromocyclopropanes require lower reaction temperatures than the corresponding gem-dichlorocyclopropanes. The reaction is exothermic and thus a temperature profile serves as a convenient index of reaction imitation. Reactions at atmospheric pressure are most convenient although here again variations in pressure are permissible.

In most cases, the reaction proceeds very satisfactorily in the absence of a reaction diluent. However, if desired the system may include an inert diluent which is liquid under the reaction conditions being employed. For this purpose, such substances as paraffins, cycloparaffins, aromatic hydrocarbons, and ethers may be employed.

When the gem-dihalocyclopropane reactant is an n,n-dihalobicyclo[n-3.1.0]-hydrocarbon compound, the reaction produces a new and useful class of β-haloallylic phenols. Thus, an embodiment of this invention is the provision of a β-haloallylic phenol wherein the phenolic nucleus of a phenolic compound is substituted in the ortho or para position with a group of the formula

wherein X is halogen and R is an alkylene bridge up to about 5 carbon atoms in length. The preferred compounds are those in which the halogen atom is a chlorine atom and those in which the phenolic nucleus of a mononuclear, monoydric phenol is so-substituted. These new compounds are suitable for use as germicides, fungicides, pesticides, intermediates for the synthesis of benzofurans, and antioxidants for organic material normally susceptible to oxidation on exposure to air (e.g., gasoline, polymers, lubricating oils, rubber, etc.). Other uses for these compounds will be clearly evident to those skilled in the art.

Exemplary of the new compounds of this invention are the following:

ortho-(2-chlorocyclohept-2-en-1-yl)phenol:

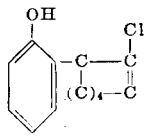

para-(2-chlorocyclohept-2-en-1-yl)phenol:

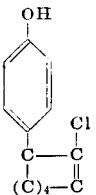

ortho-(2-chlorocyclohex-2-en-1-yl)phenol:

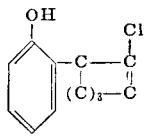

para-(2-chlorocyclohex-2-en-1-yl)phenol:

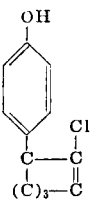

para-(2-bromocyclooct-2-en-1-yl)-2,6-dimethyl phenol:

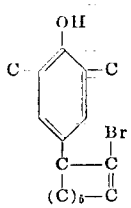

ortho-(2-iodocyclopent-2-en-1-yl)-p-tert-butyl phenol:

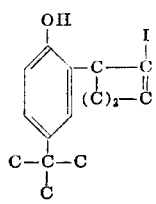

(2-chlorocyclohex-2-en-1-yl)hydroquinone:

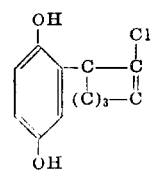

4-(2-bromocyclohept-2-en-1-yl)-1-naphthol:

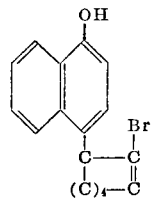

This invention will be still further apparent from a consideration of the following illustrative Examples I–IV. In the experiments embodied in these examples, the phenol and sodium used were commercial products and were not furthr purified. The gem-dichlorocyclopropanes were prepared by reaction of the appropriate olefin, chloroform, and sodium hydroxide in tetraglyme [Tetrahedron Letters, 1749(1965)]. They were freed of impurities by distillation through an 18 inch spinning band column. Their purity was verified by gas-liquid chromatography. Melting points and boiling points are uncorrected. Gas-liquid chromatography studies used a 15′ SE30 column in an F and M 500 instrument.

EXAMPLE I

Phenolysis of dichloronorcarane

Into a 300 ml. three-necked flask equipped with an air condenser and a stirrer was put 75 ml. (0.85 mole) phenol. The phenol was heated to 110° C., in a nitrogen atmosphere and 5 g. (0.22 mole) sodium was added cautiously in small portions. After complete reaction of the sodium the flask was heated in an oil bath held at 188° C. and 16.5 g. (0.10 mole) 7,7-dichloronorcarane was added. A vigorous reaction ensued. The oil bath was kept at 170–188° C. for 55 minutes. The resultant product mixture was partitioned between ether and water. The crude phenolysis product was isolated by distillation of ether and phenol through a Claisen head at 40 mm. Hg. There was obtained 30.2 g. residual material which showed three product peaks on examination by gas-liquid chromatography (programed from 100° to 225° C. at 15°/min.). The various products were isolated by distillation through an 18 inch spinning band column. The most volatile component (B.P. 104–106° C./0.25 mm., M.P. 14° C.) was insoluble in Claisen's alkali: U.V. (n-hexane) λ max. 253 (log ε 3.93), λ max. 280 (log ε 3.37), and λ max. 287 mμ (log ε 3.36) characteristic for a benzofuran; mmr. shifts (p.p.m. relative to tetramethylsilane) 1.52 (6 protons, aliphatic methylenes), 2.42 (2 protons, methylene at 3 position), 2.72 (2 proton, methylene at 2 position), 6.9–7.5 (4 aromatic protons). This substance was 2,3-pentamethylenobenzofuran.

*Analysis.*—Calc'd for C₁₃H₁₄O (percent): C, 83.82; H, 7.58. Found (percent): C, 83.66, 83.82; H, 7.63, 7.70.

The product of intermediate boiling point (B.P. 128° C./0.13 mm.) evolved hydrogen chloride on standing and yielded 2,3-pentamethylenobenzofuran. It was not otherwise characterized but was tentatively identified as ortho-(2-chlorocyclohept-2-en-1-yl)phenol. The least volatile product was a white solid (M.P. 86–87° C. from n-heptane, B.P. 150–170° C./0.1 mm.). Characteristic infrared bands (chloroform solution) were noted at 2.80 (hydroxyl), 2.99 (hydrogen bonded hydroxyl), 6.08 (trisubstituted olefin), 7.99 (COH deformation), 8.54 (COH stretch), and 5.31, 5.66, 12.07μ (para disubstituted benzene). These infrared data suggested with material to be para (2 - chlorocyclohept - 2-en-1-yl)phenol. The mmr. spectrum show proton absorption at 1.6 (four proton multiplet), 2.1 (four proton multiplet), 3.82 (one proton triplet, tertiary CH), 5.6 (one proton, hydroxyl), 6.18 (one proton triplet, vinyl CH), and 6.72, 6.87, 7.07, 7.22 p.p.m. (four aromatic protons) in agreement with the proposed structure.

*Analysis.*—Calc'd for C₁₃H₁₅ClO (percent): C, 70.10; H, 6.79; Cl, 15.92. Found (percent): C, 69.7, 70.0; H, 6.85, 6.96; Cl, 15.9.

Isolation of two of the three products in good purity permitted analysis of the crude mixture by gas-liquid chromatography with a tetradecene internal standard. The factor for ortho-(2-chlorocyclohept-2-en-1-yl)phenol was assumed the same as for the para-isomer. On this basis there was obtained 5.4 g. (29%) 2,3-pentamethylenobenzofuran, 3.1 g. (14%) ortho-(2-chlorocyclohept-2-en-1-yl)phenol, and 3.9 g. (17%) of the para isomer. Overall yield 60%.

EXAMPLE II

Phenolysis of 6,6-dichlorobicyclo[3.1.0]hexane

A solution of sodium phenolate in phenol prepared from 100 g. (1.03 mole) phenol and 5 g. (0.22 mole) sodium was heated under nitrogen to 152° C. At this temperature the sodium phenolate completely dissolved and 15.1 g. (0.10 mole) 6,6-dichlorobicyclo[3.1.0]hexane was added with stirring during 20 minutes. The temperature rose to 175° C. during the addition and was kept at 173–175° C. for one hour. The reaction mixture was acidified with 30 ml. acetic acid and washed with water. Distillation of unreacted phenol left 17.9 g. crude product. Examination by gas-liquid chromatography (15′SE30 at 215° C.) showed three product peaks. By analogy with the dichloronorcarane phenolysis products the peaks were tentatively identified as 1,2,3,4-tetrahydrodibenzofuran, ortho- and para - 2 - (2 - chlorocyclohex-2-en-1-yl)phenol. Uncorrected area ratios were 21:60:19. Separation of the components was attempted on an 18 inch spinning band distillation column. A small amount of the presumed 1,2,3,4-tetrahydrodibenzofuran was obtained by extraction of forerun cuts with Claisen's alkali: infrared bands (chloroform) at 5.18, 5.29, 5.41, 5.56, and 5.65μ (ortho-disubstituted benzene). Lack of material prevented further characterization. A substantial amount of pure ortho-(2 - chlorocyclohex - 2 - en - 1 - yl)phenol was obtained (B.P. 113–114° C./0.12 mm.): infrared bands (chloroform) at 2.82 (non-bonded hydroxyl), 5.25, 5.58, 5.85 (ortho-disubstituted benzene), and 6.05μ (unconjugated disubstituted olefin); mmr. proton shifts 1.34–2.33 (six protons, methylene groups), 3.97 (one proton, tertiary CH), 5.20 (one proton, hydroxyl), 6.13 (one proton, vinyl CH), and 6.5–7.3 p.p.m. (4 aromatic protons). A phenoxyacetate derivative was prepared and analyzed (M.P. 196–200° C. from ethanol-water).

*Analysis.*—Calc'd for C₁₄H₁₅O₃Cl (percent): C, 63.04; H, 5.67. Found (percent): C, 62.7, 62.9; H, 5.74, 5.79.

Decomposition in the pot made it necessary to stop the distillation at this point. Repeated extraction of the pot residues with n-hexane yielded para-(2-chlorocyclohex-2-en-1-yl)phenol (M.P. 108–110° C. from n-hexane): infrared bands (chloroform) at 5.29 and 5.88 (para disubstituted benzene), 6.06 (trisubstituted olefin), and 2.99μ (strongly bonded hydroxyl).

*Analysis.*—Calc'd for C₁₂H₁₃OCl (percent): C, 69.06; H, 6.28. Found (percent): C, 68.8, 69.1; H, 6.31, 6.39.

Determination of yield by gas-liquid chromatography with a tetradecene internal standard gave 0.8 g. (4.6%) 1,2,3,4-tetrahydrodibenzofuran, 11.6 g. (56%) ortho, and 3.0 g. (14%) para-(2-chlorocyclohex-2-en-1-yl)phenol. The overall yield was 75%.

EXAMPLE III

Phenolysis of 1,1-dichloro-2-n-butylcyclopropane

A solution of sodium phenolate in phenol was prepared by reaction of 100 g. (1.03 mole) phenol with 5.0 g. (0.22 mole) sodium. The solution was heated under a nitrogen atmosphere to 135° C. and 16.7 g. (0.10 mole) 1,1-dichloro-2-n-butylcyclopropane was added and stirring was begun. The mixture was heated gradually. Obvious reaction began at 158° C. and the temperature rose in ten minutes to 176° C. where it was kept for eighty minutes.

The sodium chloride formed was separated by filtration of the reaction mixture through a "C" porosity sintered glass filter. The flask and solids were thoroughly washed with methanol. There was obtained 4.4 g. (0.075 mole) sodium chloride. The filtrate was partitioned between water and ether after acidification with acetic acid. The ether layer was distilled to remove ether and phenol at 40 mm. leaving 19.4 g. crude product. Examination of this product by gas-liquid chromatography at 200° C. indicated the presence of two benzofurans, an allyl ether, a small amount of unidentified material, an ortho-allylphenol, and a para-allylphenol. Assignments were based on solubility in Claisen's alkali and on analogy with previous product mixtures. Careful fractionation of the crude product through an 18 inch spinning band column gave first a mixture of two benzofurans (B.P. 75–78° C./0.13 mm.): U.V. (n-hexane) λ max. 251 (log ε 3.82 ) λ max. 278 (log ε 3.25), and λ max. 286 mμ (log ε 3.25)²; infrared bands (chloroform) 5.21, 5.31, 5.52, 5.66 and 13.45μ (ortho-disubstituted benzene). This mixture was not further characterized. The next substance (B.P. 94–97° C./ 0.17 mm.) was homogeneous by gas-liquid chromatography and was identified as 2-chlorohept-2-en-1-yl phenyl ether: infrared bands (chloroform) 5.02, 5.20, 5.45, 5.66, 13.30, 14.52 (monosubstituted benzene), and 6.25μ (trisubstituted olefin); mmr. proton shifts in p.p.m. 0.87 (three protons, methyl group), 1.3 (four protons, methylene groups), 2.2 (two protons, allylic methylene), 4.53 (two protons, methylene flanked by oxygen and a double bond), 5.86 (one proton triplet olefinic), and 6.8–7.5 (five aromatic protons). A satisfactory elemental analysis was not obtained. A material (B.P. 110–112° C./0.23 mm.) was identified as ortho-(2-chlorohept-2-en-1-yl)-phenol: infrared bands (chloroform) 2.87 (hindered hydroxyl), 6.02 and 11.92 (trisubstituted olefin), and 13.28μ (ortho-di-substituted benzene); mmr. proton shifts in p.p.m. 0.88 (three protons, methyl group), 1.3 (four protons, methylene groups), 2.2 (two protons, allylic methylene), 3.64 (two protons, benzylic methylene), 5.29 (one proton, hydroxyl), 5.52 (one proton, olefinic), and 6.7–7.3 (four aromatic protons). This material gave a phenoxyacetate (M.P. 129–130° C., 50% aq. ethanol).

*Analysis.*—Calc'd for C₁₅H₁₉O₃Cl (percent): C, 63.71; H, 6.77; Cl, 12.54; neutral eq. 283. Found (percent): C, 63.82, 63.81; H, 6.94, 6.92; Cl, 12.7; neutral eq. 289.

The para-(2-chlorohept-2-en-1-yl)phenol (B.P. 113° C./1.17 mm.) was obtained in low purity: mmr. proton shifts in p.p.m. 0.92 (three protons, methyl group), 1.3 (four protons, methylenes), 2.2 (two protons, allylic methylene), 3.50 (two protons, benzylic methylene), 5.50 (one proton, olefinic), 6.28 (one proton, hydroxyl), and 6.7–7.2 (four aromatic protons, two doublets). The material was not further characterized. An accurate yield was not determined. Using uncorrected peak areas with a tetradecene internal standard one finds: 0.72 g. (4%) mixed benzofurans, 3.8 g. (17%) 2-chlorohept-2-en-1-yl phenyl ether, 3.8 g. (17%) ortho-(2-chlorohept-2-en-1-yl)-phenyl, and 0.95 g. (4%) para isomer. These are minimum yields since the sodium chloride recovery suggests incomplete reaction and correction factors larger than one on the peak areas are usual.

EXAMPLE IV

Phenolysis of cis and trans-1,1-dichloro-2-ethyl-3-methylcyclopropane

A solution of sodium phenolate in phenol was prepared from 100 g. (1.03 mole) phenol and 5 g. (0.22 mole) sodium. This solution was heated to 152° C. under nitrogen and 15.3 g. (0.10 mole) of a roughly 1:1 mixture of cis and trans-1,1 - dichloro-2-ethyl-3-methylcyclopropane was added slowly. The temperature of the reaction mixture rose rapidly to 175° C. and was kept at 175–169° C. for one hour. The hot mixture was filtered through a "C" porosity filter. The solids separated were washed with methanol and dried giving 6.8 g. (0.116 mole) sodium chloride. Examination by gas-liquid chromatography (programed from 75° to 225° C. at 7.9°/mm.) of the crude reaction mixture revealed a minor amount of unreacted starting cyclopropane. The area percents of the various products were: benzofuran, 6; allyl ether, 5; ortho-allylphenol, 64; para-allyphenol, 25. After removal of phenol 19.1 g. of crude product remained. A portion of this product was distilled through an 18 inch spinning band column. Only the phenolic fractions were examined. The most volatile material (B.P. 98–101° C./0.08–0.14 mm.) gave a single symmetrical peak on gas-liquid chromatography. However, the mmr. spectrum clearly showed that the material was a mixture of ortho-(4-chlorohex-3-en-5-yl)-phenol and ortho-(3-chlorohex-2-en-4-yl)-phenol with the former slightly predominating (ratio 62/38). A doublet at 1.40 p.p.m. (J=6) is easily assigned to a methyl group adjacent to the tertiary aliphatic proton and is of greater intensity than the doublet at 1.67 p.p.m. (J=7) assigned to an allylic methyl group split by a single adjacent vinyl proton. The methyl and methylene absorptions of the ethyl group are reasonably well resolved in the two isomers and confirm the relative proportions of the two isomers. The para isomers (B.P. 114–115° C./0.17 mm.) also gave a single symmetrical peak on the SE 30 column. As in the ortho isomers the mmr. spectrum showed the product to be a mixture. The ratio of para-(4-chlorohex-3-en-6-yl)phenol to para-(3-chlorohex-2-en-4-yl)phenol was 44/56. This is a reversal from the ortho isomer mixture. In this case also well resolved methyl doublets are found at 1.36 p.p.m. (J=8.5) assigned to the methyl group adjacent to the tertiary proton and at 1.69 p.p.m. (J=7) assigned to the allylic methyl group. The ethyl group protons overlap badly in the two isomers so an independent check on the analysis is not possible in this case.

What is claimed is:

1. A process for the preparation of β-haloallylic phenols which comprises heating a mixture of (1) a gem-dihalocyclopropane containing not more than one additional ring fused to the cyclopropane ring, from 3 to about 60 carbon atoms in the total molecule, and at least one hydrogen substituent on the cyclopropane ring, (2) a monohydric or polyhydric phenol having on its nucleus a hydrogen substituent in a position ortho or para to a hydroxyl group, the remainder of the nucleus carrying hydrogen atoms or inert substituents, or both, said hydrogen-bearing ortho or para position being sufficiently unhindered sterically as to be susceptible to haloallylation, and (3) an alkali metal salt of a phenolic compound at a temperature within the range of about 100 to about 200° C. sufficient to effect reaction and formation of the β-haloallylic phenol product.

2. The process of claim 1 wherein said gem-dihalocyclopropane is a gem-dichlorocyclopropane.

3. The process of claim 1 wherein said phenol reactant is a mononuclear, monohydric phenol.

4. The process of claim 1 wherein said salt is a sodium salt.

5. The process of claim 1 wherein said gem-dihalocyclopropane is a gem-dichlorocyclopropane, wherein said phenol reactant is a mononuclear, monohydric phenol and wherein said salt is a sodium salt.

6. The process of claim 1 wherein said gem-dihalocyclopropane is a gem-dichlorocyclopropane having no additional ring fused to the cyclopropane ring.

7. The process of claim 1 wherein said gem-dihalocyclopropane is a gem-dihalocyclopropane having one additional ring fused to the cyclopropane ring.

8. The process of claim 1 wherein said gem-dihalocyclopropane is a gem-dichlorocyclopropane having no additional ring fused to the cyclopropane ring, wherein said phenol reactant is a mononuclear, monohydric phenol, and wherein said salt is a sodium salt of a mononuclear, monohydric phenol.

9. The process of claim 1 wherein said gem-dihalocyclopropane is a gem-dichlorocyclopropane having one additional ring fused to the cyclopropane ring, wherein said phenol reactant is a mononuclear, monohydric phenol, and wherein said salt is a sodium salt of a mononuclear, monohydric phenol.

10. The process of claim 1 wherein said gem-dihalocyclopropane is 7,7-dichloronorcarane, wherein said phenol reactant is phenol, and wherein said salt is sodium phenoxide.

11. The process of claim 1 wherein said gem-dihalocyclopropane is 6,6-dichlorobicyclo[3.1.0]hexane, wherein said phenol reactant is phenol, and wherein said salt is sodium phenoxide.

12. A β-haloallylic phenol wherein the phenolic nucleus of a monohydric or polyhydric phenol is substituted in an ortho or para position with a group of the formula

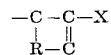

wherein X is halogen and R is an alkylene bridge from 2 up to about 5 carbon atoms in length, and the phenolic nucleus is further substituted with hydrogen atoms or inert members selected from the group consisting of alkyl, cycloalkyl aralkyl, nitro and alkoxy.

13. The composition of claim 12 wherein X is chlorine.

14. The composition of claim 12 wherein the phenolic nucleus of a mononuclear, monohydric phenol is so-substituted.

15. The composition of claim 12 wherein the nucleus of phenol is so-substituted, wherein X is chlorine, and wherein R is a trimethylene group.

16. The composition of claim 12 wherein the nucleus of phenol is so-substituted, wherein X is chlorine, and wherein R is a tetramethylene group.

17. The composition of claim 12 wherein the so-substituted phenol is selected from the group consisting of phenol, resorcinol, catechol, hydroquinone, 1-naphthol, 2-naphthol, 4 - hydroxydiphenyl, 4,4' - dihydroxydiphenyl, 4,4'-methylenebisphenol, o-cresol, m-cresol, p-cresol, p-benzylphenol, o-cyclohexyl phenol, o-ethyl phenol, o-isopropyl phenol, o-tert-butyl phenol, m-tert-butyl phenol, p-tert-butyl phenol, 2,6-diisopropyl phenol, 2,6-di-tert-butyl phenol, o-tert-amyl phenol, p-nonyl phenol, 4-methyl-1-naphthol, o-nitrophenol, m-nitrophenol, p-nitrophenol, 4-hydroxyanisole, and 2,3,4-trimethyl phenol.

References Cited

UNITED STATES PATENTS 2,002,447   5/1935   Deichsel _____ 260—624B
2,681,371   6/1954   Gaydasch _____ 260—624

BERNARD HELFIN, Primary Examiner

W. B. LONE, Assistant Examiner

U.S. Cl. X.R.

260—622R, 624R, 625, 619D, 619F, 999, 45.95, 814; 252—399, 54

UNITED STATES PATENT OFFICE
CERTIFICATE OF CORRECTION

Patent No. 3,600,448　　　　　　　Dated August 17, 1971

Inventor(s) Gene C. Robinson

It is certified that error appears in the above-identified patent and that said Letters Patent are hereby corrected as shown below:

In the heading to the printed specification, after line 5, insert -- Assignor to Ethyl Corporation, New York, N. Y. --. Column 2, line 31, "aryloxideand" should read -- aryloxide and --; line 48, "imitation" should read -- initiation --. Column 3, line 1, "monoydric" should read -- monohydric --. Column 7, line 6, "para-allyphenol" should read -- para-allylphenol --. Column 8, line 33, "cycloalkyl aralkyl" should read -- cycloalkyl, aralkyl --.

Signed and sealed this 12th day of September 1972.

(SEAL)
Attest:

EDWARD M. FLETCHER, JR.　　　　　　　ROBERT GOTTSCHALK
Attesting Officer　　　　　　　　　　Commissioner of Patents